(12) United States Patent
Albert

(10) Patent No.: US 6,431,421 B1
(45) Date of Patent: Aug. 13, 2002

(54) SKI RACK WITH EASY LOADING

(76) Inventor: Bret Albert, 11954 Lariat La., Truckee, CA (US) 96161

( * ) Notice: Subject to any disclaimer, the term of this patent is extended or adjusted under 35 U.S.C. 154(b) by 0 days.

(21) Appl. No.: 09/546,007

(22) Filed: Apr. 8, 2000

(51) Int. Cl.[7] .................................................. B60R 9/00
(52) U.S. Cl. ....................................................... 224/310
(58) Field of Search ........................................... 224/310

(56) References Cited

U.S. PATENT DOCUMENTS 5,535,929 A * 7/1996 Neill ............................ 224/310
5,782,391 A * 7/1998 Cretcher ....................... 224/310
5,884,824 A * 3/1999 Spring, Jr. .................... 224/310
6,015,074 A * 1/2000 Snavely et al. ............... 224/310

* cited by examiner

Primary Examiner—Gregory M. Vidovich
Assistant Examiner—Maerena W. Brevard
(74) Attorney, Agent, or Firm—Goldstein & Lavas, P.C.

(57) ABSTRACT

A ski rack with easy loading including a fixed support securable to the roof portion of the vehicle. A sliding support is slidably coupled with the fixed support. A ski support is secured to the central housing of the sliding support. A locking member prevents movement of the sliding support with respect to the fixed support.

7 Claims, 2 Drawing Sheets

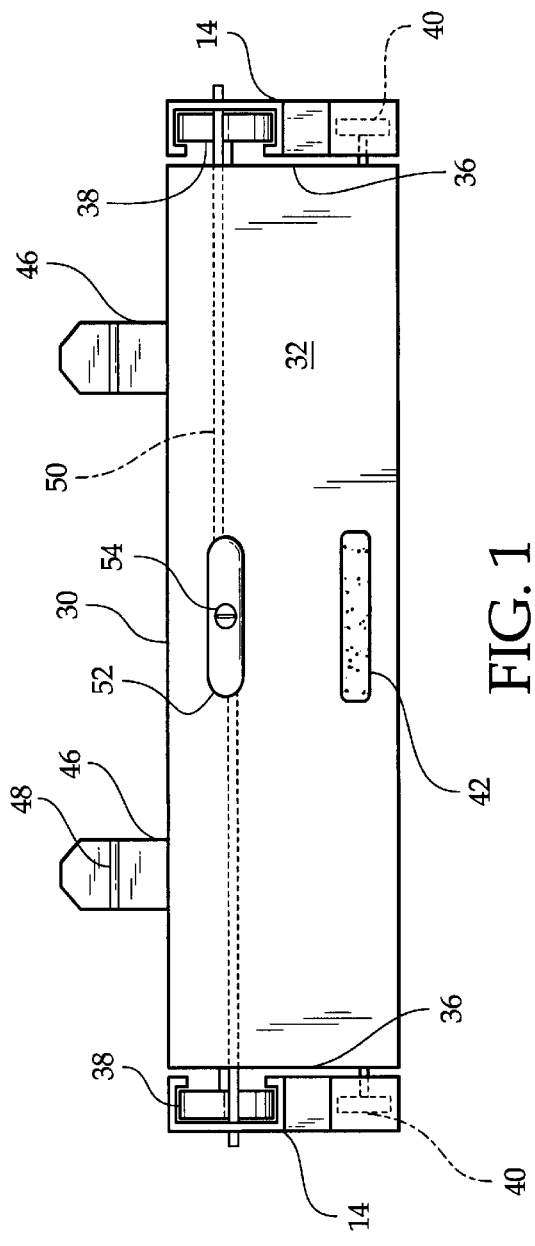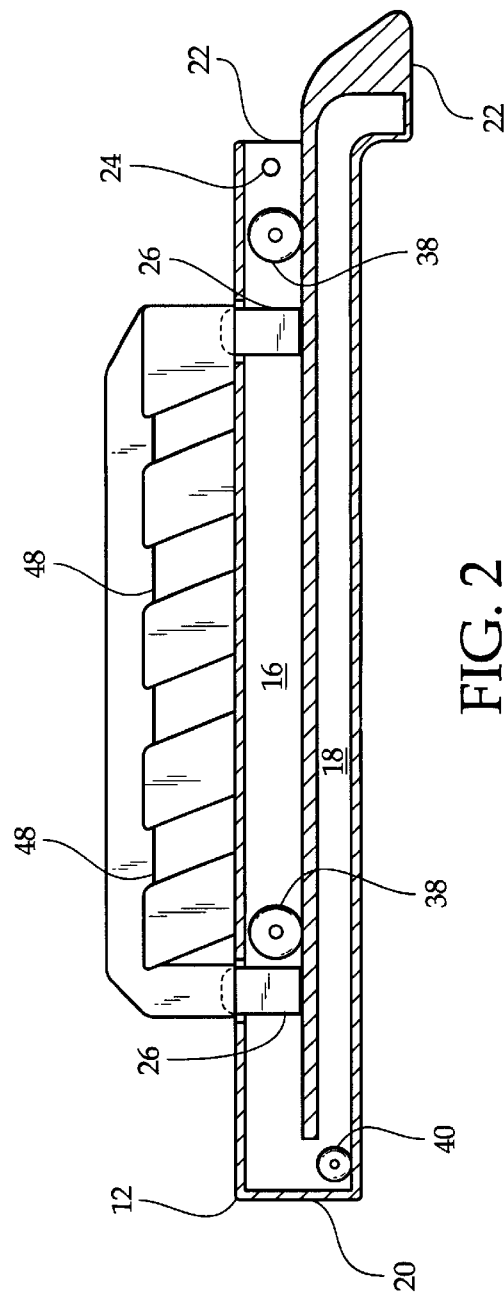

SKI RACK WITH EASY LOADING

BACKGROUND OF THE INVENTION

The present invention relates to a ski rack with easy loading and more particularly pertains to allowing for skis and snowboards to be secured to the rack from a side of a vehicle.

The use of vehicle rack assemblies is known in the prior art. More specifically, vehicle rack assemblies heretofore devised and utilized for the purpose of transporting items atop a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,193,124 to Essling discloses a rack for transporting an article comprised of a slide hinge for minimized effort during loading. U.S. Pat. No. 2,654,515 to Svoboda discloses a boat rack for an automobile with a track and roller for loading.

While these devices fulfill their respective, particular objective and requirements, the aforementioned patents do not describe a ski rack with easy loading for allowing for skis and snowboards to be secured to the rack from a side of a vehicle.

In this respect, the ski rack with easy loading according to the present invention substantially departs from the conventional concepts and designs of the prior art, and in doing so provides an apparatus primarily developed for the purpose of allowing for skis and snowboards to be secured to the rack from a side of a vehicle.

Therefore, it can be appreciated that there exists a continuing need for a new and improved ski rack with easy loading which can be used for allowing for skis and snowboards to be secured to the rack from a side of a vehicle. In this regard, the present invention substantially fulfills this need.

SUMMARY OF THE INVENTION

In the view of the foregoing disadvantages inherent in the known types of vehicle rack assemblies now present in the prior art, the present invention provides an improved ski rack with easy loading. As such, the general purpose of the present invention, which will be described subsequently in greater detail, is to provide a new and improved ski rack with easy loading which has all the advantages of the prior art and none of the disadvantages.

To attain this, the present invention essentially comprises a fixed support securable to the roof portion of the vehicle. The fixed support portion is comprised of a pair of opposed tracks disposed in a parallel orientation. The tracks each have an upper channel and a lower channel. The upper channel and the lower channel each have an inner end and an outer end. The outer ends of the upper channels are open. The outer ends of the lower channels are downwardly turned and closed. The upper channels each have corresponding apertures therethrough inwardly of the open outer ends thereof. The upper channels each have stop members positioned therein in a spaced relationship. A sliding support is slidably coupled with the fixed support. The sliding support is comprised of a central housing. The central housing has a front wall, a rear wall, and opposed side walls. The opposed side walls each have a pair of upper rollers extending outwardly therefrom in a spaced relationship. The opposed side walls each have a single lower roller extending outwardly therefrom inwardly of the rear wall. The central housing is positioned between the pair of opposed tracks of the fixed support with the upper rollers positioned within the upper channels of the tracks and the single lower rollers positioned within the lower channels of the tracks. A support pad is secured to the front wall of the central housing. A ski support is secured to the central housing of the sliding support. The ski support is comprised of a pair of opposed bars each having a plurality of angular slots formed therein in a spaced relationship. A locking member prevents movement of the sliding support with respect to the fixed support. The locking member includes an elongated shaft extending through the corresponding apertures of the upper channels. The locking member includes a locking cylinder disposed within the front wall of the central housing for selectively engaging the elongated shaft.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ski rack with easy loading which has all the advantages of the prior art vehicle rack assemblies and none of the disadvantages.

It is another object of the present invention to provide a new and improved ski rack with easy loading which may be easily and efficiently manufactured and marketed.

It is a further object of the present invention to provide a new and improved ski rack with easy loading which is of durable and reliable construction.

An even further object of the present invention is to provide a new and improved ski rack with easy loading which is susceptible of a low cost of manufacture with regard to both materials and labor, and which accordingly is then susceptible of low prices of sale to the consuming public, thereby making such a ski rack with easy loading economically available to the buying public.

Even still another object of the present invention is to provide a new and improved ski rack with easy loading for allowing for skis and snowboards to be secured to the rack from a side of a vehicle.

Lastly, it is an object of the present invention to provide a new and improved ski rack with easy loading including a fixed support securable to the roof portion of the vehicle. A sliding support is slidably coupled with the fixed support. A ski support is secured to the central housing of the sliding support. A locking member prevents movement of the sliding support with respect to the fixed support.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the ski rack with easy loading constructed in accordance with the principles of the present invention.

FIG. 2 is a side view of the present invention illustrated in cross-section.

The same reference numerals refer to the same parts through the various figures.

DESCRIPTION OF THE PREFERRED EMBODIMENT

Figure 3:
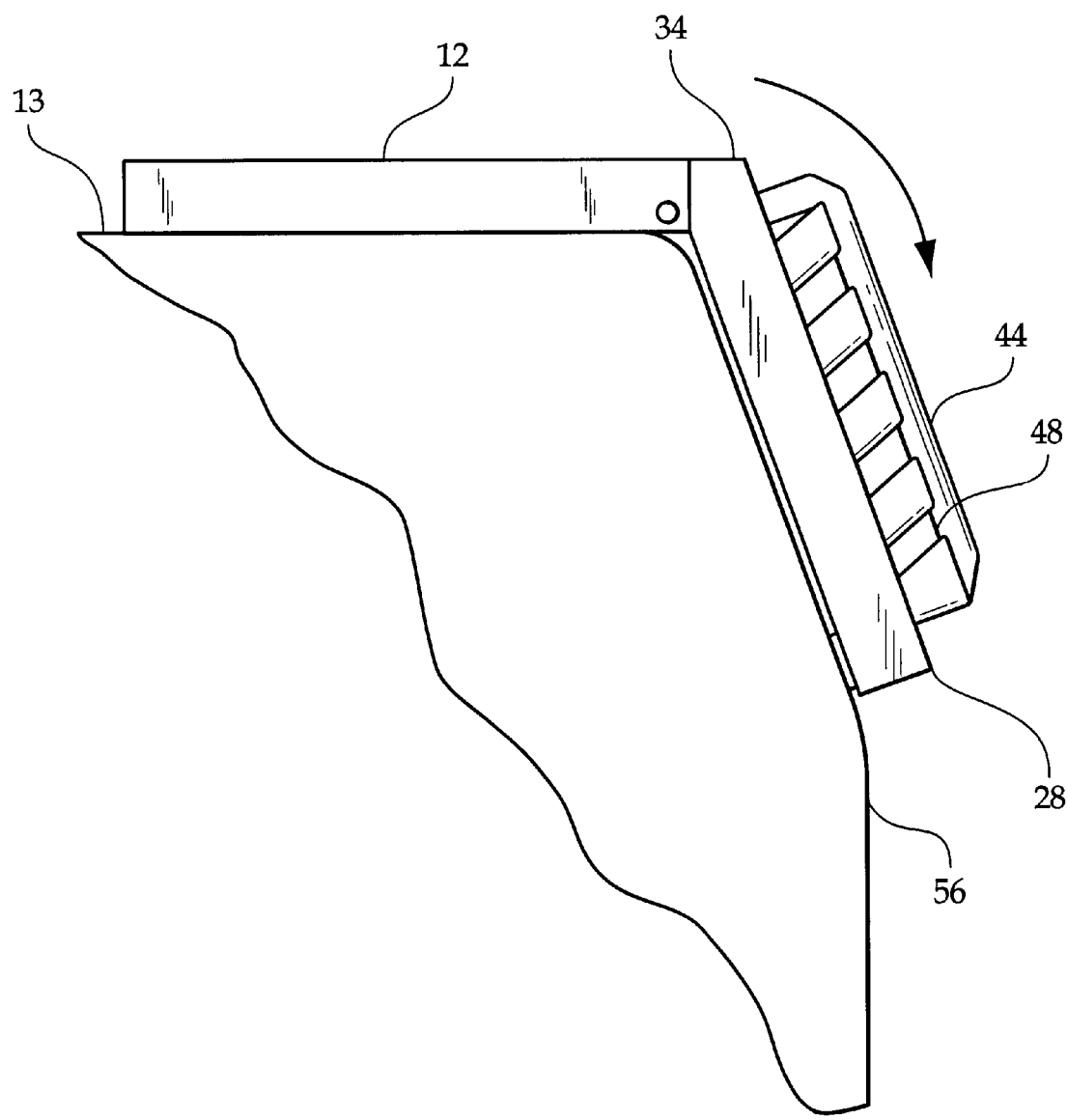
FIG. 3 is a side view of the present invention illustrated in a lowered orientation.

With reference now to the drawings, and in particular, to FIGS. 1 through 3 thereof, the preferred embodiment of the new and improved ski rack with easy loading embodying the principles and concepts of the present invention and generally designated by the reference number 10 will be described.

Specifically, it will be noted in the various Figures that the device relates to a ski rack with easy loading for allowing for skis and snowboards to be secured to the rack from a side of a vehicle. In its broadest context, the device consists of a fixed support, a sliding support, a ski support, and a locking member. Such components are individually configured and correlated with respect to each other so as to attain the desired objective.

The fixed support 12 is securable to the roof portion 13 of the vehicle. The fixed support portion 12 is comprised of a pair of opposed tracks 14 disposed in a parallel orientation. The tracks 14 each have an upper channel 16 and a lower channel 18. The upper channel 16 and the lower channel 18 each have an inner end 20 and an outer end 22. The outer ends 22 of the upper channels 16 are open. The outer ends 22 of the lower channels 18 are downwardly turned and closed. The upper channels 16 each have corresponding apertures 24 therethrough inwardly of the open outer ends 22 thereof. The upper channels 16 each have stop members 26 positioned therein in a spaced relationship.

The sliding support 28 is slidably coupled with the fixed support 12. The sliding support 28 is comprised of a central housing 30. The central housing 30 has a front wall 32, a rear wall 34, and opposed side walls 36. The opposed side walls 36 each have a pair of upper rollers 38 extending outwardly therefrom in a spaced relationship. The opposed side walls 36 each have a single lower roller 40 extending outwardly therefrom inwardly of the rear wall 34. The central housing 30 is positioned between the pair of opposed tracks 14 of the fixed support 12 with the upper rollers 38 positioned within the upper channels 16 of the tracks 14 and the single lower rollers 40 positioned within the lower channels 18 of the tracks 14. A support pad 42 is secured to the front wall of the central housing 30.

The ski support 44 is secured to the central housing 30 of the sliding support 28. The ski support 44 is comprised of a pair of opposed bars 46 each having a plurality of angular slots 48 formed therein in a spaced relationship. The slots 48 will be dimensioned for receiving skis and/or snowboards therein.

The locking member prevents movement of the sliding support 28 with respect to the fixed support 12. The locking member includes an elongated shaft 50 extending through the corresponding apertures 24 of the upper channels 16. The locking member includes a locking cylinder 52 disposed within the front wall 32 of the central housing 30 for selectively engaging the elongated shaft 50. The locking cylinder 52 includes a key receiving slot 54 that allows for the locking cylinder 52 to either lock or unlock the elongated shaft 50. In order for the sliding support 28 to slide outwardly with respect to the fixed support 12, the elongated shaft 50 must be removed from between the corresponding apertures 24.

In use, the sliding support 28 slides outwardly with respect to the fixed support 12. The upper rollers 38 will slide outwardly of the open outer ends 22 of the upper channels 22 while the single lower rollers 40 will be positioned within the downwardly turned closed outer ends 22 of the lower channel 18. The single lower rollers 40 will act as a pivot point to allow the sliding support 28 to rest against the side portion 56 of the vehicle. This will allow the skis or snowboards to be loaded onto the ski support 44. Once the skis and/or snowboards have been loaded, the sliding support 28 can slide back within the upper and lower channels 16,18 of the fixed support 12. The stop members 26 will prevent the sliding support 28 from sliding too far with respect to the fixed support 12. Once the sliding support 28 is fully within the fixed support 12, the elongated shaft 50 is positioned through the corresponding apertures 24 whereby the elongated shaft 50 is positioned forwardly of the upper rollers 38 to prevent the sliding support 28 from exiting the fixed support 12. The locking cylinder 52 can then re-engage the elongated shaft 50.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A ski rack with easy loading for allowing for skis and snowboards to be secured to the rack from a side of a vehicle, the vehicle having a roof portion and opposed side portions, the ski rack with easy loading comprising, in combination:

a fixed support securable to the roof portion of the vehicle, the fixed support portion being comprised of a pair of opposed tracks disposed in a parallel orientation, the tracks each have an upper channel and a lower channel, the upper channel and the lower channel each having an inner end and an outer end, the outer ends of the upper channels being open, the outer ends of the lower channels being downwardly turned and closed;

a sliding support slidably coupled with the opposed tracks of the fixed support, the sliding support comprised of a central housing, the central housing having a front wall, a rear wall, and opposed side walls, the opposed side walls each having a pair of upper rollers extending outwardly therefrom in a spaced relationship, the opposed side walls each having a single lower roller extending outwardly therefrom inwardly of the rear wall, the central housing being positioned between the pair of opposed tracks of the fixed support with the upper rollers positioned within the upper channels of the tracks and the single lower rollers positioned within the lower channels of the tracks;

a ski support secured to the sliding support;

a locking member preventing movement of the sliding support with respect to the fixed support.

2. The ski rack with easy loading as set forth in claim 1 wherein a support pad is secured to the front wall of the central housing.

3. The ski rack with easy loading as set forth in claim 1 wherein the ski support is comprised of a pair of opposed bars each having a plurality of angular slots formed therein in a spaced relationship.

4. The ski rack with easy loading as set forth in claim 1 wherein the upper channels of the fixed support portion each having corresponding apertures therethrough inwardly of the open outer ends thereof, the locking member including an elongated shaft extending through the corresponding apertures of the upper channels.

5. The ski rack with easy loading as set forth in claim 4 wherein the locking member includes a locking cylinder disposed within the front wall of the central housing for selectively engaging the elongated shaft.

6. The ski rack with easy loading as set forth in claim 1 wherein the upper channels of the fixed support portion each have stop members positioned therein in a spaced relationship.

7. A ski rack with easy loading for allowing for skis and snowboards to be secured to the rack from a side of a vehicle, the vehicle having a roof portion and opposed side portions, the ski rack with easy loading comprising, in combination:

a fixed support securable to the roof portion of the vehicle, the fixed support portion being comprised of a pair of opposed tracks disposed in a parallel orientation, the tracks each having an upper channel and a lower channel, the upper channel and the lower channel each having an inner end and an outer end, the outer ends of the upper channels being open, the outer ends of the lower channels being downwardly turned and closed, the upper channels each having corresponding apertures therethrough inwardly of the open outer ends thereof, the upper channels each having stop members positioned therein in a spaced relationship;

a sliding support slidably coupled with the fixed support, the sliding support comprised of a central housing, the central housing having a front wall, a rear wall, and opposed side walls, the opposed side walls each having a pair of upper rollers extending outwardly therefrom in a spaced relationship, the opposed side walls each having a single lower roller extending outwardly therefrom inwardly of the rear wall, the central housing being positioned between the pair of opposed tracks of the fixed support with the upper rollers positioned within the upper channels of the tracks and the single lower rollers positioned within the lower channels of the tracks, a support pad secured to the front wall of the central housing;

a ski support secured to the central housing of the sliding support, the ski support comprised of a pair of opposed bars each having a plurality of angular slots formed therein in a spaced relationship;

a locking member preventing movement of the sliding support with respect to the fixed support, the locking member including an elongated shaft extending through the corresponding apertures of the upper channels, the locking member including a locking cylinder disposed within the front wall of the central housing for selectively engaging the elongated shaft.

* * * * *